United States Patent [19]

Stone et al.

[11] Patent Number: 4,674,773
[45] Date of Patent: Jun. 23, 1987

[54] INSULATING COUPLING FOR DRILL COLLARS AND METHOD OF MANUFACTURE THEREOF

[75] Inventors: Frederick A. Stone, Durham; Robert J. Maron, Cromwell, both of Conn.

[73] Assignee: Teleco Oilfield Services Inc., Meriden, Conn.

[21] Appl. No.: 799,623

[22] Filed: Nov. 19, 1985

Related U.S. Application Data

[62] Division of Ser. No. 572,801, Jan. 23, 1984.

[51] Int. Cl.⁴ .............................................. F16L 11/12
[52] U.S. Cl. .......................................... 285/48; 285/54; 285/333
[58] Field of Search ...................... 285/48, 53, 54, 333, 285/334, 355; 10/1 R; 427/423, 407.1, 190; 428/36, 450, 469; 29/428, 527.2; 175/50

[56] References Cited

U.S. PATENT DOCUMENTS

| | | | |
|---|---|---|---|
| 1,859,311 | 5/1932 | McEvoy, Jr. | 285/53 |
| 2,173,003 | 9/1939 | Place | 10/1 R |
| 2,300,823 | 11/1942 | Whitman | 175/50 |
| 2,313,384 | 3/1943 | Lee | 324/369 |
| 2,388,141 | 10/1945 | Harrington | 175/50 |
| 2,917,704 | 12/1959 | Arps | 175/50 |
| 2,940,787 | 6/1960 | Goodner | 285/47 |
| 3,101,207 | 8/1963 | Pavel et al. | 285/355 |
| 3,150,321 | 9/1964 | Summers | 324/323 |
| 3,382,563 | 5/1968 | Barroil et al. | 285/54 |
| 3,687,493 | 8/1972 | Lock et al. | 285/286 |
| 3,941,903 | 3/1976 | Tucker, Jr. | 427/423 |
| 4,421,799 | 12/1983 | Novinski | 427/423 |
| 4,496,174 | 1/1985 | McDonald et al. | 285/53 |
| 4,529,631 | 7/1985 | Neudahm | 427/423 |
| 4,589,187 | 5/1986 | Stone et al. | 285/333 |

FOREIGN PATENT DOCUMENTS

| | | | |
|---|---|---|---|
| 2706624 | 8/1978 | Fed. Rep. of Germany | 285/53 |
| 1437587 | 5/1976 | United Kingdom | 285/54 |

*Primary Examiner*—Cornelius J. Husar
*Assistant Examiner*—Anthony Knight
*Attorney, Agent, or Firm*—Fishman & Dionne

[57] ABSTRACT

An insulating coupling for drill collars and a method of manufacture thereof are presented wherein the coupling consists of an electrically insulating ceramic coating applied in thickness from 0.002 to 0.006 inch to the threads of the coupling by a detonation gun process and sealed with an epoxy sealer to reduce porosity.

8 Claims, 3 Drawing Figures

INSULATING COUPLING FOR DRILL COLLARS AND METHOD OF MANUFACTURE THEREOF

This application is a division of application Ser. No. 572,801, filed Jan. 23, 1984.

BACKGROUND OF THE INVENTION

This invention relates to the field of insulated couplings for drill collars. More particularly, this invention relates to an insulated drill collar coupling and the method of manufacture thereof, wherein the threads of the coupling joint are coated with a layer of insulating material to effect electrical isolation between adjacent sections of a drill collar to prevent a flow of electrical current axially along the drill collar.

In the field of borehole drilling, there are several reasons for which it may be desirable to provide electrical isolation between adjacent segments of a drill collar. One of the principal reasons for wanting to electrically isolate adjacent sections of a drill collar is for the purpose of using the drill string as an electrical conduit for the transmission to the surface of data collected at the bottom of the well during the course of drilling. This concept of electrical telemetry has been known for many years, but it has not been applied on a serious commercial basis because of a number of problems. One of the principal problems involves the inability to produce a suitable insulated joint to provide electrical isolation between adjacent segments of the drill collar without seriously compromising the structural integrity of the drill collar. Typically, insulated joints heretofore known in the art have had a number of serious deficiencies or drawbacks, principal among which is the inability to withstand the stresses caused by torque loads in assembling and using the drill string.

Insulated joints of one kind or another are shown in a number of issued U.S. patents. While not intending to present an exhaustive list, typical prior art insulated joints are shown in U.S. Pat. Nos. 3,150,321, 2,940,787, 2,917,704, 2,388,141, 2,313,384, 2,300,823 and 1,859,311.

SUMMARY OF THE INVENTION

The above discussed and other drawbacks and deficiencies of the prior art are overcome or reduced by the insulating coupling and method of manufacture thereof of the present invention. In accordance with the present invention, an insulated coupling is formed with a coating of insulating ceramic material on the threads of one of the coupling segments. Prior to application of the insulating ceramic coating, the threads are machined to remove an amount of material equal to the thickness of the ceramic coating to be applied, so as to preserve the dimensional integrity of the coupling. The insulated ceramic coating is applied by a detonation gun process, and the coating is applied within a critical thickness range, to provide the desired combination of achieving the desired electrical resistance while preserving the structural integrity of the joint.

The above discussed and other features and advantages of the present invention will be apparent to and understood by those skilled in the art from the following detailed description and drawings.

BRIEF DESCRIPTION OF THE DRAWINGS

Referring now to the drawings.

DESCRIPTION OF THE PREFERRED EMBODIMENT

Figure 1:
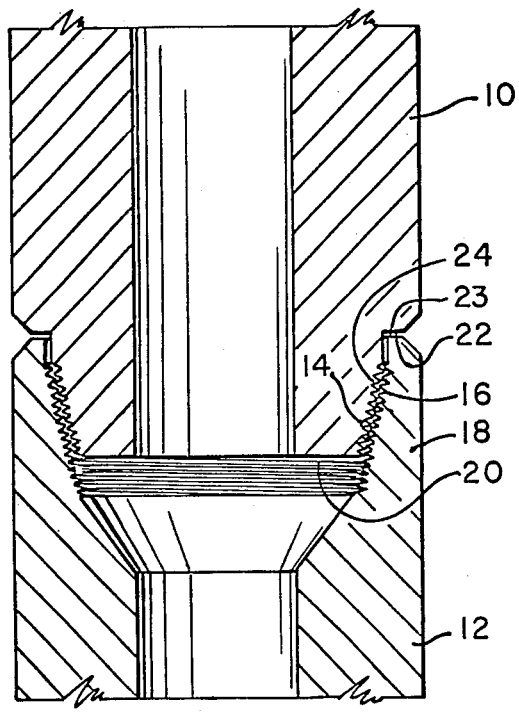
FIG. 1 is a sectional elevation view of a joint section of a drill collar with the insulating coupling of the present invention.

Although it may find application in other environments, the present invention is primarily intended for use in a drill string for the drilling of oil and gas wells. More particularly, the present invention is intended to provide an insulated coupling between segments of a drill collar in a drill string so that the drill string may be used as an electrical conduit for electrical telemetry to the surface of data gathered down the well relating to borehole information, such as directional drilling data, well logging data, etc. Since the drill string and the rest of the environment may be conventional, the drawings show only the drill collar segment which incorporates the insulated joint of the present invention.

Referring now to the several figures of the drawings, an upper segment 10 of a drill collar is connected to a lower segment 12 by an insulated threaded joint 14. In the vicinity of joint 14, drill collar segment 10 may consist of an American Petroleum Institute (API) "pin" connection 16, and drill collar segment 12 consists of an API "box" connection 18. The pin and box connections 16 and 18 have mating threads (shown in detail in FIG. 2) to form a threaded connection between drill collar segments 10 and 12. The threads extend between end section 20 on drill collar segment 10 and shoulder 23 on drill collar segment 12.

Figure 2:
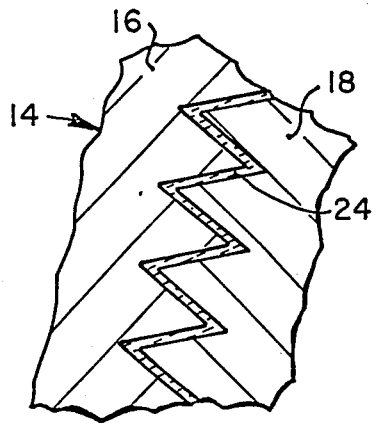
FIG. 2 is an enlarged view of a portion of the coupling of FIG. 1.

Referring particularly to FIG. 2, the threaded connection between box 18 and pin 16 is shown in detail. In accordance with the present invention, an electrically insulating ceramic coating 24, such as aluminum oxide, is applied to the threads on pin element 16. The insulating ceramic coating will be applied to the entire length or axial span of the threads, and the insulating coating will also extend onto the end section 20 and shoulder 22 of drill collar segment 10 to insure electrical isolation between the drill collar segments. While it is also possible to apply the coating to the threads of box element 18 and shoulder 23 of drill collar segment 12, the insulating ceramic coating will be applied to one or the other of the joint segments, but it is not necessary to apply the coating to both.

Figure 3:
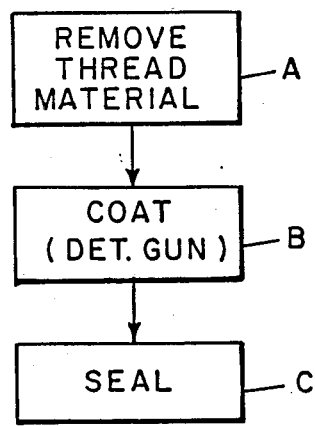
FIG. 3 is a flow diagram of the method of forming the insulating coupling of the present invention.

As shown in the flow process of FIG. 3, joint 14 is formed by a multi-step process. In step A, a small amount of material is removed from the threads and shoulder section of the joint segment which is to be coated with the insulating material. Thus, assuming that the insulating ceramic coating is to be applied to pin element 16 of drill collar segment 10, a small amount of material, equal in depth to the depth or thickness of the coating to be applied, is removed from the threads on the pin segment 16 and shoulder area 22, as by machining. Next, in step B, a coating of the insulating ceramic material, preferably aluminum oxide, is applied to the reduced thread and shoulder areas to return those parts of pin section 16 to their original dimensions and, optionally, to end section 20 as a possible safety precaution against shorting. The insulating ceramic coating is applied by a detonation gun process known in the art, and the insulation coating is applied along the entire axial and circumferential extent of the threads and along the shoulder area and optional end area (all of which may be considered to be the "threaded section" as used in the specification and claims) to insure electrical isolation between the drill collar segments. After the insulating coating 24 has been applied to the threaded section, the aluminum oxide is sealed, in step C, with an epoxy or similar type sealer to eliminate or reduce porosity.

As an alternative to removing material from drill collar segment 10, it is also possible to form drill collar segment 10 undersized by the thickness of the ceramic coating to be applied, and thereafter applying the desired thickness of ceramic insulating coating.

In accordance with the present invention, it is essential that the coating 24 be applied in a critical range of thickness on the threads to be insulated. This critical range of thickness is between 0.002 and 0.006 inch for the thickness of the coating. A coating which is less than 0.002 inch thickness may not provide the necessary electrical resistance, even though it may maintain its mechanical integrity. Conversely, a coating which is greater than 0.006 inch may be susceptible to chipping off at the thread crests, which will result in a loss of electrical insulation and may also impair structural integrity. A coating greater than 0.006 inch may chip off because the greater thickness of the coating causes the brittle ceramic to be more highly stressed as it tries to follow the deformation of the threads of the joint when torque is applied during assembly. With a coating maintained in the critical thickness range between 0.002 inch and 0.006 inch, the joint of the present invention establishes and maintains electrical isolation between drill collar segments 10 and 12 without any significant impairment of the structural integrity and torque carrying capability of the joint. Also, it is to be noted that it is essential to the practice of the present invention that the insulating coating 24 will be applied by a detonation gun process such as Union Carbide's known detonation gun process or an equivalent process which will produce a bond between the ceramic insulating material and the metal threads sufficient to withstand the stresses and torque encountered in assembly and using the drill collar. Plasma spray and similar processes are not suitable, because they do not result in a bond of sufficient strength to withstand the stresses encountered in the system.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An insulating drill collar joint, including:
   a first metallic drill collar segment having a first threaded section with a coating of electrically insulating ceramic material thereon;
   said insulating coating being in the range of from 0.002 to 0.006 inch thick; and
   a second metallic drill collar segment connected to said first drill collar segment, said second drill collar segment having a second threaded section threadably engaged with the insulation coated threaded section of said first drill collar section whereby an electrically insulated drill collar joint is formed.

2. The insulated drill collar joint of claim 1 wherein: said coating of ceramic material is applied by a detonation gun process.

3. The insulated drill collar joint of claim 1 wherein: said first threaded section is reduced in thickness from its normal dimension by an amount equal to the thickness of said ceramic coating.

4. The insulated drill collar joint of claim 1 wherein: said ceramic coating is aluminum oxide.

5. The insulated drill collar joint of claim 1 including: a coating of sealer on said ceramic material wherein said sealer coating is effective to reduce porosity.

6. The insulated drill collar joint of claim 5 wherein: said coating of ceramic material is applied by a detonation gun process.

7. The insulated drill collar joint of claim 5 wherein: said first threaded section is reduced in thickness from its normal dimension by an amount equal to the thickness of said ceramic coating.

8. The insulated drill collar joint of claim 5 wherein: said ceramic coating is aluminum oxide.

* * * * *